(12) United States Patent
Hinz et al.

(10) Patent No.: US 8,091,931 B2
(45) Date of Patent: Jan. 10, 2012

(54) UNIT WITH AT LEAST TWO HYDRAULIC CONNECTIONS FASTENED TO IT

(75) Inventors: Axel Hinz, Neu-Anspach (DE);
Hans-Jörg Feigel, Rosbach (DE); Uwe Greiff, Bad Homburg (DE); Petra Fischbach-Borazio, Frankfurt (DE)

(73) Assignee: Continental Teves AG & Co., oHG (DE)

( * ) Notice: Subject to any disclaimer, the term of this patent is extended or adjusted under 35 U.S.C. 154(b) by 347 days.

(21) Appl. No.: 12/373,796

(22) PCT Filed: Jul. 4, 2007

(86) PCT No.: PCT/EP2007/056708
§ 371 (c)(1),
(2), (4) Date: Jan. 14, 2009

(87) PCT Pub. No.: WO2008/012176
PCT Pub. Date: Jan. 31, 2008

(65) Prior Publication Data
US 2009/0250923 A1    Oct. 8, 2009

(30) Foreign Application Priority Data

Jul. 26, 2006 (DE) .......................... 10 2006 035 220
Dec. 23, 2006 (DE) .......................... 10 2006 061 461

(51) Int. Cl.
*F16L 39/00* (2006.01)
(52) U.S. Cl. ..................................... 285/384; 285/124.1
(58) Field of Classification Search .................. 285/385, 285/384, 346, 234, 233, 353, 124.1–124.4
See application file for complete search history.

(56) References Cited

U.S. PATENT DOCUMENTS

| | | | | |
|---|---|---|---|---|
| 412,940 A * | 10/1889 | Aldcorn | .......................... | 285/269 |
| 1,863,870 A * | 6/1932 | Moore | .......................... | 285/246 |
| 2,902,299 A * | 9/1959 | Turner | .......................... | 285/258 |
| 2,926,935 A * | 3/1960 | La Marre | .......................... | 285/184 |
| 3,151,893 A * | 10/1964 | Lyon | .......................... | 285/143.1 |
| 3,742,583 A * | 7/1973 | Devlin et al. | .......................... | 29/413 |
| 3,814,466 A * | 6/1974 | Leopold, Jr. | .......................... | 285/55 |
| 3,854,372 A | 12/1974 | Gutshall | | |
| 4,267,870 A | 5/1981 | Warner | | |
| 5,052,719 A * | 10/1991 | Boehm | .......................... | 285/4 |
| 5,516,157 A * | 5/1996 | Williamson | .......................... | 285/212 |
| 5,658,017 A * | 8/1997 | Chirehdast et al. | .......................... | 285/4 |

(Continued)

FOREIGN PATENT DOCUMENTS

DE       1 886 745       1/1964

(Continued)

*Primary Examiner* — Aaron Dunwoody
(74) *Attorney, Agent, or Firm* — RatnerPrestia

(57) ABSTRACT

An electrohydraulic unit assembly for a motor vehicle includes a receiving body defining a sealing face and at least two connectors fastened to the receiving body of the unit, oriented substantially parallel one to another and separated by a defined distance from one another. Each connector is configured for connecting a fluid conduit to the unit. Each connector includes a screw fitting for fastening the respective hydraulic connection to the receiving body of the unit such that a sealing face of the screw fitting or a sealing face of the fluid conduit is seated on the sealing face of the receiving body. Each screw fitting is rotatably connected to the body and includes two spanner flat portions having different spanner widths.

12 Claims, 3 Drawing Sheets

U.S. PATENT DOCUMENTS

| | | | | |
|---|---|---|---|---|
| 6,527,304 | B1 * | 3/2003 | Pliassounov | 285/334.5 |
| 6,663,146 | B1 * | 12/2003 | Sakai et al. | 285/353 |
| 6,981,721 | B2 * | 1/2006 | Karasawa | 285/353 |
| 7,380,841 | B2 * | 6/2008 | Hall et al. | 285/353 |
| D583,026 | S * | 12/2008 | Dirneder | D23/262 |
| 7,533,909 | B2 * | 5/2009 | Sausner et al. | 285/353 |
| 2001/0028170 | A1 | 10/2001 | Sausner et al. | |
| 2006/0279081 | A1 * | 12/2006 | Liao | 285/124.2 |
| 2007/0252384 | A1 * | 11/2007 | Dickerson et al. | 285/89 |
| 2009/0145488 | A1 * | 6/2009 | Hoskisson et al. | 137/318 |

FOREIGN PATENT DOCUMENTS

| | | |
|---|---|---|
| DE | 2 352 380 | 5/1974 |
| DE | 197 43 185 A1 | 4/1999 |
| DE | 198 08 626 A1 | 9/1999 |
| DE | 101 03 175 A1 | 8/2002 |
| DE | 100 60 691 B4 | 6/2004 |
| DE | 103 41 480 A1 | 3/2005 |
| JP | 8-4973 | 1/1996 |
| JP | 8-19968 | 1/1996 |

* cited by examiner

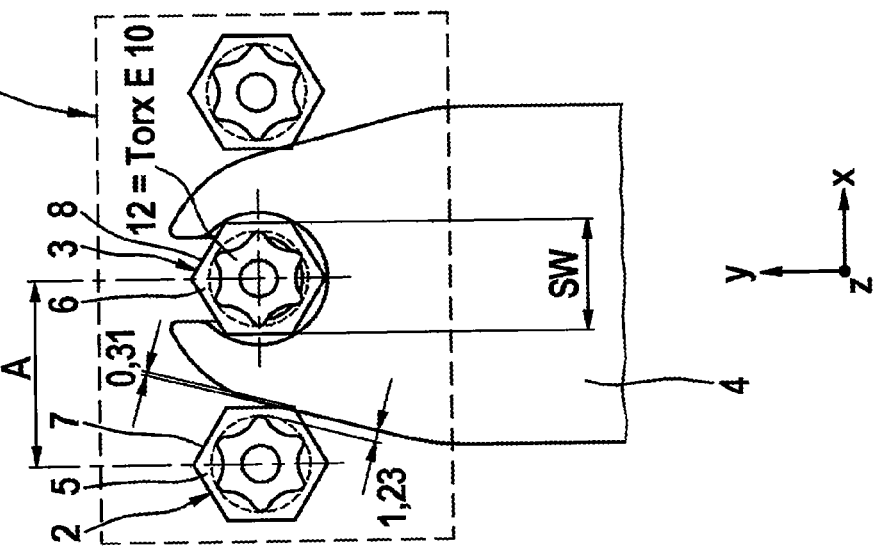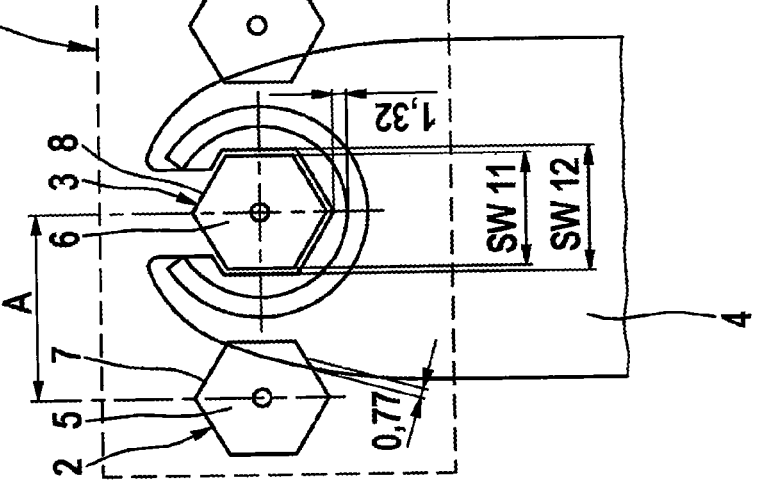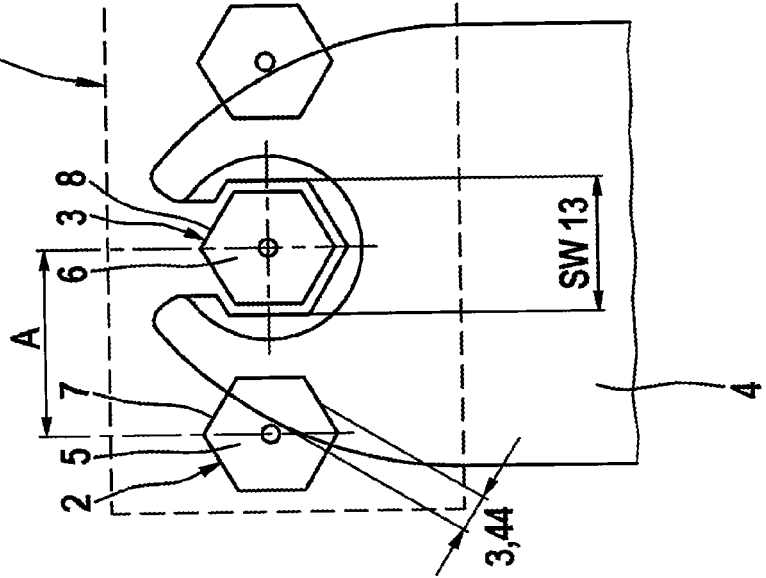

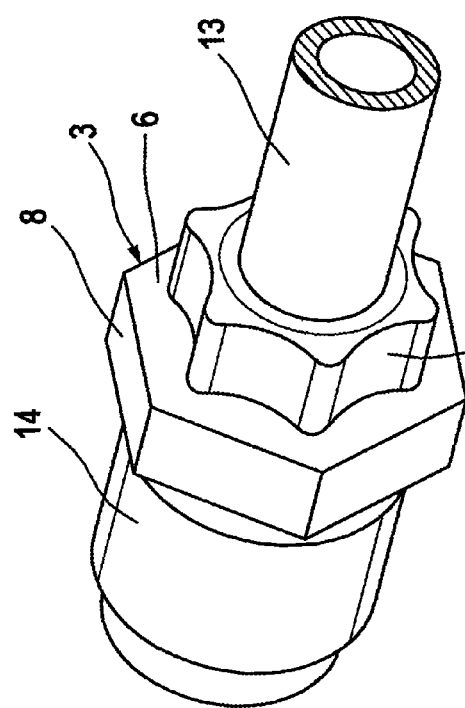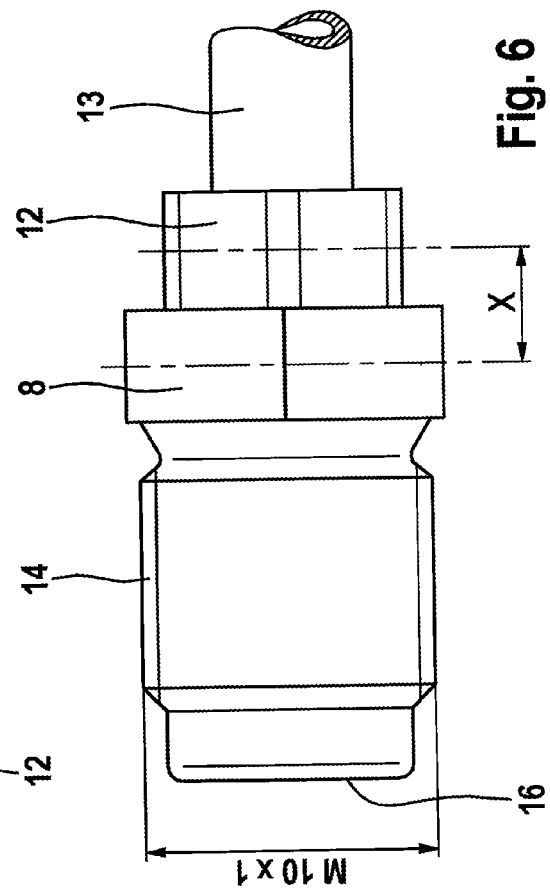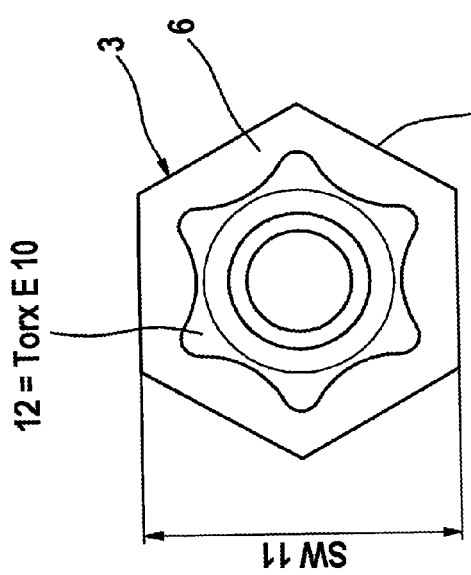

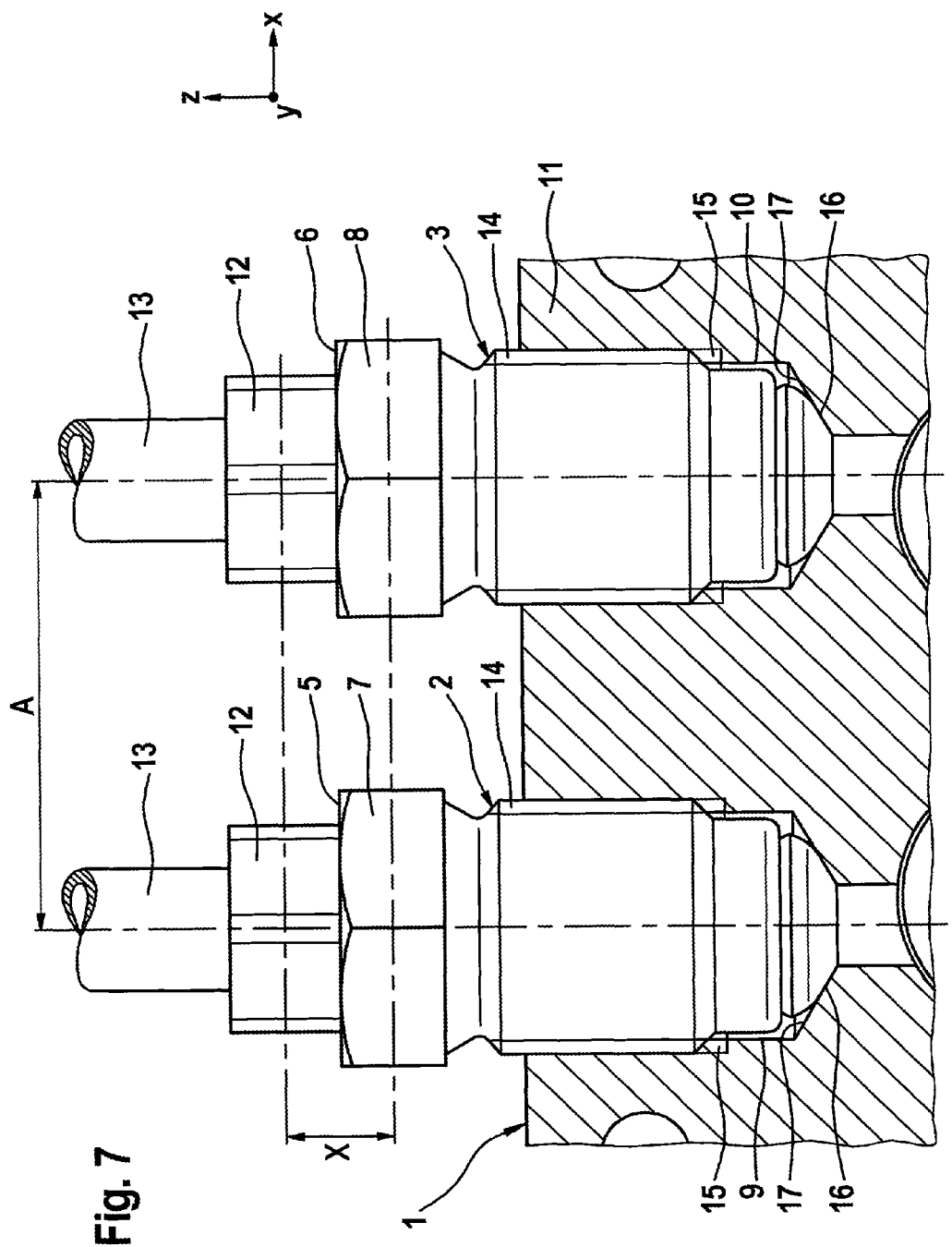

UNIT WITH AT LEAST TWO HYDRAULIC CONNECTIONS FASTENED TO IT

CROSS REFERENCE TO RELATED APPLICATIONS

This application is the U.S. national phase application of PCT International Application No. PCT/EP2007/056708, filed Jul. 4, 2007, which claims priority to German Patent Application No. DE102006035220.3, filed Jul. 26, 2006 and German Patent Application No. DE102006061461.5, filed Dec. 23, 2006, the contents of such applications being incorporated by reference herein.

BACKGROUND OF THE INVENTION

1. Field of the Invention

The invention relates to a unit with at least two hydraulic connections fastened thereto by means of screw fittings, which hydraulic connections are provided parallel to one another at a defined distance from one another.

2. Description of the Related Art

The invention relates to a unit with at least two hydraulic connections fastened thereto by means of screw fittings, which hydraulic connections are provided parallel to one another at a defined distance from one another. The invention further relates to a preferably power-driven screwing tool for the screw fittings of hydraulic connections.

The unit is preferably a hydraulic unit with a complex bore structure, comprising further components such as a motor-driven pump and valves for chassis and/or brake control, although units comparable in principle, namely a brake actuation unit, may also be relevant. The connected component is preferably in the form of a pipe or hose with a screw fitting, the screw fittings being located at the aforementioned pre-defined distance from one another. In this case each screw fitting has in principle an external thread which is received in a receiving bore with an internal thread in the unit. As it is a general requirement of the unit described to have a space requirement as small as possible in the motor vehicle, the positioning of the receiving bore is guided primarily by consideration of how a unit size as small as possible (miniaturization) can be achieved.

In principle, therefore, a primary objective is to arrange the receiving bores with the internal threads for receiving the screw-in components at a distance from another which is as short as possible.

However, this basic objective meets with its limit in the conditions of large-volume series assembly regarding the insertion of the screw fittings. For if the defined distance between the receiving bores is too short, insufficient space is present to attach, for example, a pneumatic or electric-motor driven screwing head with an appropriately dimensioned screwing tool to the screw fitting. This problem is aggravated by the fact that, because of the outgoing pipe or hose axis, the screwing tool must be attached from the side, that is, at right angles to the hose axis.

Compressed-air screw-drivers which include energy supply means (hose, cable) in addition to an actual tool holder are generally used, for which the available installation space is in many cases insufficient. Incorrect assembly can be a serious consequence of restricted installation space.

However, it is neither satisfactory nor appropriate to provide a unit with receiving bores which are arranged intentionally—and perhaps only for assembly reasons—at a greater distance from one another than is absolutely necessary. This measure would in itself lead to an unnecessary increase in unit size.

In a comparable context an adapter with defined receptacles for brake pipe lines was proposed by the applicant according to DE 197 43 185 A1. Arrangements of this kind cannot be adapted simply and flexibly to different bore positions in a modular manner. Rather, each modification in bore positioning necessitates a special adapter, which increases construction cost and hinders introduction to the market.

SUMMARY OF THE INVENTION

It is an object of the present invention to offer a flexible solution in order to provide a greatly miniaturized unit with screw-in components which can be installed in a favorable manner even in confined installation conditions. In other words, the invention is intended to make it possible to arrange the receiving bores for screw fittings in any desired proximity to one another without causing the aforementioned assembly problems.

By arranging redundant spanner flat portions at an axial distance from one another it is further made possible, for example, that the conventional spanner flat portions with large widths across the flats (hereinafter spanner widths), which are arranged close to the unit, are used for replacement and workshop purposes, that is, for cases in which an automated screw-driver with the appropriate tool is not available for the second spanner flat portion. In other words the second spanner flat portion is available primarily for first assembly purposes at the premises of a first user.

These and other aspects of the invention are illustrated in detail by way of the embodiments and are described with respect to the embodiments in the following, making reference to the Figures.

BRIEF DESCRIPTION OF THE DRAWINGS

Developments of the invention are apparent from the description and the drawing, in which:

FIGS. 1 to 3 show a schematized view of different arrangement constellations with screwing head for a given spacing A of hydraulic connections, FIGS. 4 to 6 show views of a screw fitting with two spanner flat portions for each hydraulic connection, and FIG. 7 shows a section through a unit with screw fittings according to FIGS. 4 to 6.

DETAILED DESCRIPTION OF THE PREFERRED EMBODIMENTS

FIGS. 1 and 2 make clear in an exemplary manner the problem of lack of installation space for fastening hydraulic connections 2, 3 to an electrohydraulic unit 1 using conventional, motorized screw-drivers, of which only the screwing heads 4 are represented partially and schematically. Hydraulic connections 2, 3 are provided at a given spacing A on a rudimentarily sketched electrohydraulic unit 1. The hydraulic connections 2, 3 are in the form of pipes 13 or hoses, and comprise respective screw fittings 5, 6, each with a single spanner flat portion 7, 8 of a specific spanner width. The screw fittings 5, 6 are secured in receiving bores 9, 10 of a receiving body 11. The receiving bores 9, 10, like the associated screw fittings 5, 6, are substantially parallel to one another. FIG. 1 makes clear for a selected spanner width SW 13 that an overlap of 3.44 mm is present between screw fittings 5, 6 and screwing head 4. In other words, the screwing head 4 cannot be inserted between adjacent screw fittings 5, 6 when using the necessary tools.

FIG. 2 shows that in the case of a tendentially reduced spanner width SW 12 a conventional screwing head 4 cannot be fitted because the screw fittings 5, 6 of adjacent hydraulic connections 2, 3 interfere in the region of the screwing head 4, and that an overlap of at least 0.77 mm is present. The miniaturization of the unit 1 therefore meets with a limit at a predefined spacing A, which depends on the precise configuration of the screwing head 4.

FIG. 3 shows a variant with a screw fitting 5 in the case of which, through the selection of a spanner flat portion 7 (in the form of an external hexagon) having a spanner width SW further reduced in comparison to FIGS. 1 and 2, and when using an additional spanner flat portion 12, a screwing head 4 can be readily fitted. In this case the additional spanner flat portion 12 preferably has an internal hexagon or internal star profile which is used for fitting the screwing head 4. By contrast, the other spanner flat portion 7 is used substantially for manual emergency purposes.

FIGS. 4 to 6 show in detail a variant of a screw fitting 5 with two spanner flat portions 7, 12 of different sizes and spaced apart axially by a distance X. Such a screw fitting 5 is threaded over an end of a pipe 13 or hose and is used for fastening to the unit 1. The two screw fittings 2, 3 are each in the form of an internally hollow male fitting with an external thread 14, which fitting extends around the end of the relevant line. The external thread 14 further engages in an associated internal thread 15 inside the receiving bore 9 of the receiving body 11.

By means of the screw fitting 5 a sealing face of the screw fitting 5, or a sealing face 16 of the pipe 13, is tensioned against an associated sealing face 17 of the receiving body 11. For this purpose a pipe line end may have, for example, a flange standardized in principle. The sealing face 16 of the flange is pressed by the screw fitting 5 in abutment against the associated sealing face 17 of the receiving body 11.

As can be seen in particular from FIGS. 4 to 6, the two spanner flat portions 7, 12 are arranged at an axial distance X from one another. The two spanner flat portions 7, 12 have different spanner widths SW. If the spanner flat portion 7 closer to the receiving body 11 has a larger spanner width SW and is configured with external spanner flats, and the spanner flat portion 12 further away has smaller spanner flats SW, perhaps even in the form of internal spanner flats (hexagon socket, star socket), slipping-off can be avoided. In principle, the spanner flat portions 7, 8, 12 may each be configured as internal spanner flats or as external spanner flats. For applications liable to corrosion external spanner flats are preferably used, while internal spanner flats are preferably provided where there is increased danger of slipping off.

In principle, adjacent screw fittings 5, 6 are configured identically. However, to avoid confusion during installation of the hydraulic connections 2, 3, it may be provided in principle that adjacent screw fittings 5, 6 are configured differently and, in particular, are provided with differently configured spanner flat portions 7, 8, 12.

In further configuration of the invention the spanner flat portions 7, 8; 12 provided on a screw fitting 5, 6 are configured differently, at least one of the spanner flat portions 7, 8; 12 being configured, for the reasons mentioned, as a hexagon socket, a star socket or multipoint.

Furthermore, a preferably power-driven tool (screwdriver) for installing the screw fitting is proposed. Accordingly, the tool has a tool insert which has a spanner width corresponding to the smaller of the two spanner flat portions 7, 8; 12 on the screw fitting 5, 6.

In principle, a solution to the problem comprises the following features:

1. A first, multiple, spanner flat portion 7, 8, preferably an annularly closed external Torx or internal Torx spanner flat portion;
2. At a predefined axial distance X from the first, multiple spanner flat portion 7, 8 a second multiple spanner flat portion 12, preferably a hexagon spanner flat portion which makes possible emergency manual screwing with simple means.

With the arrangement described, the particular advantage is achieved that fitting of a (compressed-air) screw-driver to a spanner flat portion 12 of the screw fitting 5, 6 is simplified in that the spanner flat portion 12 is additionally prevented from slipping off by the spanner flat portion 7, 8 (the hexagon spanner flats) located below it.

In principle, a tool for screwing may also be configured in such a way that it fits around the axially spaced spanner flat portions 7, 8; 12 simultaneously, so that both contribute to torque transmission, resulting in improved torque application which is gentler on the spanner flats 7, 8; 12 as a result of wider distribution.

The advantages consist in improved application of the torque→more frequent screwing in and out is thereby made possible.

The arrangement described makes it possible to reduce the diameter of a preferably power-driven screwing tool through an axially staggered, stratified arrangement of a plurality of spanner flats 7, 8; 12, and therefore to achieve spacings of receiving bores 9, 10 for hydraulic connections 2, 3 which are shorter than previously attained, while the screw fittings 5, 6 can nevertheless be screwed to the unit 1 in a power-driven manner.

A different solution, independent of the above, to the problem at issue consists in equipping adjacent hydraulic connections 2, 3 on the unit 1 with differently configured screw fittings 5, 6, each of which has only a single spanner flat portion 7, 8, the screw fittings 5, 6 differing otherwise only in that the spanner flat portions 7, 8 are arranged offset to one another axially in the direction of a z coordinate. Consequently, adjacent spanner flat portions 7, 8 are not located in a common plane but are offset to one another, so to speak, in a depth direction (z coordinate). This depth-offset may be achieved by providing screw fittings 5, 6 of different lengths with spanner flat portions 7, 8 correspondingly offset to one another axially, or by configuring the screw fittings 5, 6 identically while the insertion depth of hydraulic connections 2, 3 provided directly adjacent to one another is varied. This variation may be produced by varying their insertion depth in the receiving body 11. In this connection it is especially advantageous if an alternating offset only between a first plane and a second plane is provided between adjacent hydraulic connections 2, 3, so that two parallel installation levels offset to one another in the z-coordinate direction exist. Through this offset arrangement of the spanner flat portions 7, 8 on the screw fittings 5, 6, a coding against confusion is even achieved. For incorrect pairings between hydraulic connection 2, 3 and receiving bore 9, 10 are possible only if there is elastic or plastic deformation of the hydraulic connection 2, 3 in the z-coordinate direction. All further features and configurations correspond to those of FIGS. 1 to 6, so that with respect to the present configuration reference is made to the description relating to those figures in order to avoid unnecessary repetitions.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. An electrohydraulic unit assembly comprising:
    a receiving body defining at least two adjacent receiving bores extending into a face of the receiving body;
    at least two hydraulic connections received in the respective receiving bores and fastened to the receiving body of the unit, wherein the hydraulic connections are oriented substantially parallel one to another at a defined distance (A) from one another; and
    each hydraulic connection includes a respective screw fitting for fastening the respective hydraulic connection to the receiving body of the unit, wherein each screw fitting includes a first spanner flat portion and an external thread which is received in an internal thread of the associated receiving bore of the receiving body, wherein each screw fitting includes an integral second spanner flat portion, integrated without an intended fracture zone and having a different spanner width (SW) than the first spanner flat portion.

2. The unit as claimed in claim 1, wherein the screw fitting is in the form of a hollow male fitting through which a pipe or the hose passes at least partially.

3. The unit as claimed in claim 1, wherein the first spanner flat portion and the second spanner flat portion of each hydraulic connection are arranged at an axial distance (X) from one another.

4. The unit as claimed in claim 3, wherein the first and second spanner flat portions are arranged on the screw fitting offset axially to one another in the direction of a hose axis, and in that a spanner flat portion arranged axially closer to the receiving body has a spanner width (SW) which is larger than the spanner width (SW) of the spanner flat portion arranged axially further away.

5. The unit as claimed in claim 1, wherein adjacent hydraulic connections have differently configured spanner flat portions.

6. The unit as claimed in claim 1, wherein the second spanner flat portions are configured as internal spanner flats or external spanner flats.

7. The unit as claimed in claim 1, wherein at least one of the spanner flat portions is in the form of an internal hexagon, an internal star, an internal multipoint or an external multipoint.

8. The unit as claimed in claim 1, wherein each hydraulic connection includes a pipe or hose connection.

9. The unit as claimed in claim 1, wherein longitudinal axes of the screw fittings are offset from each other by a predetermined distance.

10. The unit as claimed in claim 1, wherein the first spanner flat portion and the second spanner flat portion of at least one of the hydraulic connections are positioned against each other.

11. An electrohydraulic unit assembly for a motor vehicle comprising:
    a receiving body defining at least two adjacent receiving bores extending into a single face of the body and separated by a defined distance; and
    at least two connectors received in the respective receiving bores and fastened to the receiving body of the unit, wherein longitudinal axes of the connectors are oriented substantially parallel one to another and separated from one another by the defined distance, each connector being configured for connecting a fluid conduit to the unit,
    each connector including a screw fitting for fastening the respective hydraulic fluid conduit to the receiving body of the unit,
    each screw fitting being rotatably connected to the body and including two spanner flat portions having different spanner widths (SW).

12. The unit as claimed in claim 11, wherein the first spanner flat portion and the second spanner flat portion of at least one of the hydraulic connections are positioned against each other.

* * * * *